H. REKERSDRES.
SPEED CHANGE INDICATOR FOR VEHICLES.
APPLICATION FILED JUNE 13, 1919.
1,345,635. Patented July 6, 1920.
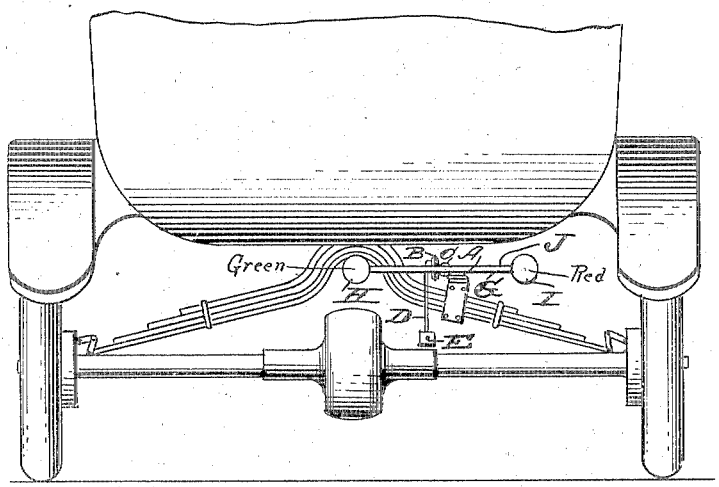
Fig. 1
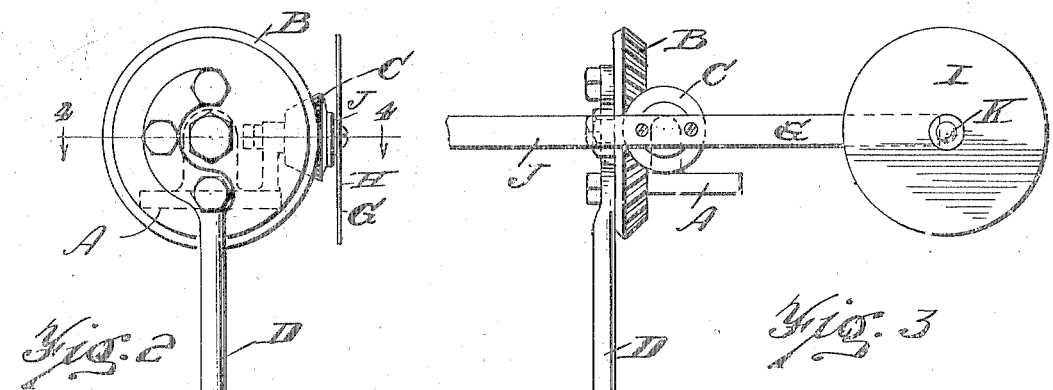
Fig. 2
Fig. 3
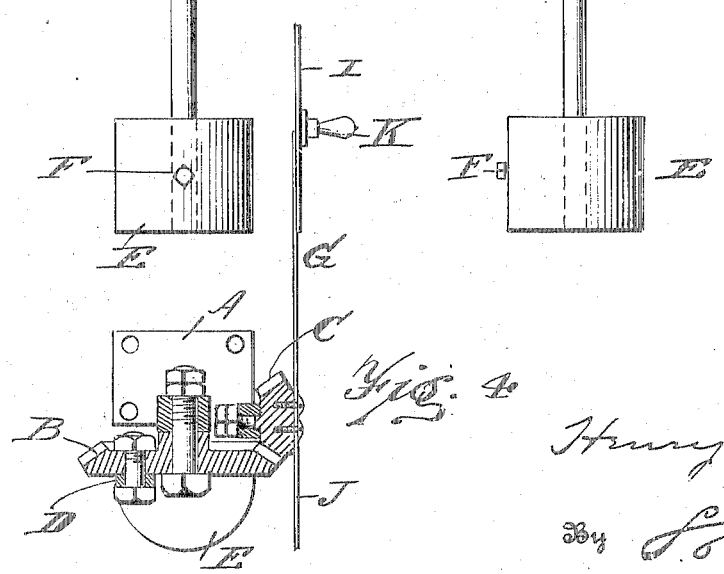
Fig. 4
Inventor
Henry Rekersdres
By J. H. Thomas
Attorney

UNITED STATES PATENT OFFICE.

HENRY REKERSDRES, OF DETROIT, MICHIGAN.

SPEED-CHANGE INDICATOR FOR VEHICLES.

1,345,635.  Specification of Letters Patent. Patented July 6, 1920.

Application filed June 13, 1919. Serial No. 303,853.

*To all whom it may concern:*

Be it known that I, HENRY REKERSDRES, a citizen of the United States, residing at Detroit, county of Wayne, State of Michigan, have invented a certain new and useful Improvement in Speed-Change Indicators for Vehicles, and declare the following to be a full, clear, and exact description of the same, such as will enable others skilled in the art to which it pertains to make and use the same, reference being had to the accompanying drawings, which form a part of this specification.

My invention relates to speed change indicating devices, whereby anyone behind a moving vehicle upon which the device is installed can instantly detect a change in the speed of said vehicle by observing the "marker" of the device.

One object of the invention is to provide a device simple in construction and operation, which will effectively and automatically indicate to the driver of a vehicle following of any change in speed of the first or leading vehicle, in order that the second vehicle may not collide with the first vehicle should the latter come to a sudden stop;—the "marker" carrying lights that it may be readily seen at night.

Another object of the invention is to simultaneously indicate any change in speed of the vehicle on which it is installed in a positive, clear and reliable manner; by night or day, so as to enable the driver of a vehicle following to govern himself accordingly that he may avoid accidental injury to himself or others, and of property.

A further object of the invention is that the action of the device shall be entirely automatic and dependent only upon the movement of the vehicle.

With the foregoing and other objects in view which will appear as the description proceeds, the invention resides in the combination and arrangement of parts and in the details of construction hereinafter described and claimed, it being understood that changes may be made in the precise embodiment herein disclosed, without departing from the spirit of the invention.

In the drawings, accompanying this specification:—

Figure 1 is a rear elevation of an automobile, showing the device installed thereon.

Fig. 2 is a side elevation of the device.

Fig. 3 is an elevation of the device at right angles to Fig. 2.

Fig. 4 is a horizontal sectional view on line 4—4 of Fig. 2.

Referring now to the letters of reference placed upon the drawings:—

A, denotes a supporting frame in which is journaled a bevel gear B, in mesh with a relatively smaller gear C, also journaled in the frame.

Secured to the outside of the larger gear is a depending rod or lever D, with a weight E, attached to its lower end by means of a set screw F.

To the gear C, is secured a tilting "marker" G. The marker consists of two disks H, and I, (which may be differently colored if desired) secured to the arm J, which is in turn attached to the gear C. K, are electric lamp bulbs carried by the disks H, and I, and are connected with a source of electrical energy (not shown).

Having indicated the several parts by reference letters, the construction and operation of my invention will be readily understood.

When the vehicle is stationary, gravity acting upon the weight E, causes the rod or lever D, to hang vertically, the marker G, assuming a horizontal position when the weight lever D, is vertical.

Upon the vehicle moving in a forward direction, the inertia of the weight causes its lever to swing in an arc, counter clockwise, which is also the direction of rotation taken by the gear B, to which the weight lever is attached.

The gears B, and C, being in mesh, the latter gear is thereby rotated causing it and the "marker" G, secured thereto to move in a clockwise direction, the angle of rotation of the marker being greater than the angle of the weight lever in the ratio of the diameter of the large gear to the diameter of the smaller gear.

As soon as uniform motion is attained the acceleration being reduced to zero, the weight lever again assumes a vertical position, the outward appearance of the device being the same as when the vehicle is at "rest." Thus rest and uniform motion indications, as given by the device, are identical.

As the vehicle "slows down," the weight E, goes forward, giving a clockwise rotative movement to the gear B, and a consequent counter-clockwise rotative movement to the gear C. When the vehicle comes to a stop, the "at rest" indications will again obtain.

Having thus described my invention, what I claim is:—

1. In a device of the character described, a movable mass adapted for attachment to a vehicle and to change its position due to the movement of the vehicle and the increasing or diminishing motion of acceleration of the latter, and an independently pivoted indicator operatively connected with said movable mass and consisting of a bar provided at its ends with separate indicating means to indicate to persons remote from the vehicle the direction of and the proportional magnitude of the increasing or decreasing acceleration of the vehicle.

2. In a device of the character described, a movable mass adapted to change its position due to the movement of a vehicle and the increasing or decreasing motion or acceleration of the latter, a marker or indicator consisting of a bar provided with terminal indicating means and arranged at right angles to the plane of and connected with the said movable mass to indicate the direction of and the proportional magnitude of the increasing or decreasing acceleration of the vehicle, and means for illuminating said marker or indicator.

3. In a speed change indicating device for vehicles, a frame adapted for attachment to a vehicle, a weighted lever pivotally suspended from the frame and adapted to oscillate in a direction longitudinally of the vehicle, a tilting indicator consisting of a bar provided at its ends with indicating means and normally arranged horizontally transversely of the vehicle, and means connecting the lever and indicator whereby the motion due to the oscillation of the said lever is transmitted in amplified magnitude to the tilting indicator.

4. In a speed change indicating device for vehicles, a weighted lever, a speed change marker consisting of a bar pivoted intermediate of its ends and provided with terminal indicating means and connected with the said lever, said bar being adapted to be actuated by the lever upon the inertia of the same being overcome through an increasing or decreasing motion of the acceleration of the vehicle.

5. In a speed change indicating device of the character described, a supporting frame, intermeshing gears of relatively different diameter journaled in said frame, a lever suspended from one of said gears, a weight attached to the ends of the lever, and a tilting device secured to the other gear adapted to indicate by day or night a change in the speed of the vehicle upon which it is installed due to the oscillation of the swinging lever.

6. In a device of the character described, a frame adapted to be secured to the rear of a vehicle, a weighted lever pivotally suspended from said frame to swing at the rear of the vehicle according to the movement of the vehicle and the increasing or decreasing motion of acceleration of the latter, a tilting indicator consisting of a bar pivoted between its ends and provided with terminal indicating means, and arranged normally in a horizontal position at the rear of the vehicle and operatively connected to said lever to indicate the direction of and the proportional magnitude of the increasing or decreasing acceleration of the vehicle so that an approximate indication of change of speed is given to persons outside the vehicle.

In testimony whereof, I sign this specification in the presence of two witnesses.

HENRY REKERSDRES.

Witnesses:
S. E. THOMAS,
JOHN CONSIDINE, Jr.